(12) United States Patent
Ma (10) Patent No.: US 11,549,277 B2
(45) Date of Patent: Jan. 10, 2023

(54) DAMPER AND LOAD-BEARING ENCLOSING STRUCTURE PROVIDED WITH DAMPER

(71) Applicant: BEIJING GOLDWIND SCIENCE & CREATION WINDPOWER EQUIPMENT CO., LTD., Beijing (CN)

(72) Inventor: Shengjun Ma, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 106 days.

(21) Appl. No.: 17/042,081

(22) PCT Filed: Sep. 12, 2018

(86) PCT No.: PCT/CN2018/105247
§ 371 (c)(1),
(2) Date: Sep. 25, 2020

(87) PCT Pub. No.: WO2020/000666
PCT Pub. Date: Jan. 2, 2020

(65) Prior Publication Data
US 2021/0010286 A1    Jan. 14, 2021

(30) Foreign Application Priority Data
Jun. 28, 2018 (CN) .......................... 201810706129.2

(51) Int. Cl.
*E04H 9/02* (2006.01)
*F03D 13/20* (2016.01)
*E04H 12/00* (2006.01)

(52) U.S. Cl.
CPC ............ *E04H 9/023* (2013.01); *E04H 9/0235* (2020.05); *F03D 13/20* (2016.05); *E04H 12/00* (2013.01);
(Continued)

(58) Field of Classification Search
CPC ....... E04H 9/023; E04H 9/0235; E04H 12/00; F05B 2260/964; F05B 2240/912;
(Continued)

(56) References Cited

U.S. PATENT DOCUMENTS 3,762,114 A * 10/1973 Eskijian .................. E04H 9/023
                                                         52/167.4
4,617,769 A * 10/1986 Fyfe ........................ E04H 9/022
                                                         52/167.8
(Continued)

FOREIGN PATENT DOCUMENTS

CN    2198325 Y     5/1995
CN    102493568 A   6/2012
(Continued)

OTHER PUBLICATIONS

International Search Report and Written Opinion issued in corresponding PCT Application No. PCT/CN2018/105247, dated Mar. 25, 2019, 11 pages.
(Continued)

*Primary Examiner* — Brian E Glessner
*Assistant Examiner* — Daniel J Kenny
(74) *Attorney, Agent, or Firm* — Bayes PLLC (57) ABSTRACT

A damper includes a vibration energy buffering transfer unit and a vibration energy dissipation unit. The vibration energy buffering transfer unit includes a plurality of piston transfer structures and connecting tubes, the piston transfer structures includes a cylinder and a piston arranged as a pair, the plurality of piston transfer structures surrounding the vibra-
(Continued)

tion energy dissipation unit, the connecting tubes interconnecting the plurality of cylinders, the vibration energy dissipation unit includes a damping liquid accommodating cavity and damping liquid accommodated in the damping solution accommodating cavity, and one end of the cylinder or the piston being connected to the damping fluid accommodating cavity. The load-bearing enclosing structure provided with said damper can effectively suppress vibration.

12 Claims, 10 Drawing Sheets

(52) U.S. Cl.
CPC ... *F05B 2240/912* (2013.01); *F05B 2260/964* (2013.01)

(58) Field of Classification Search
CPC ....... F03D 13/20; F03D 7/0296; Y02E 10/72; Y02E 10/728
See application file for complete search history.

(56) References Cited

U.S. PATENT DOCUMENTS

| | | | |
|---|---|---|---|
| 5,168,673 A | 12/1992 | Nemir et al. | |
| 7,891,420 B2* | 2/2011 | Dale | E21B 43/088 166/231 |
| 9,976,641 B2* | 5/2018 | Caldwell | F04B 49/065 |
| 10,161,387 B2* | 12/2018 | Frydendal | F03D 80/80 |
| 2020/0378466 A1* | 12/2020 | Madsen | F03D 80/80 |

FOREIGN PATENT DOCUMENTS

| | | |
|---|---|---|
| CN | 102561544 A | 7/2012 |
| CN | 102661074 A | 9/2012 |
| CN | 203716322 U | 7/2014 |
| CN | 203783823 U | 8/2014 |
| CN | 103452747 B | 11/2015 |
| CN | 204877806 U | 12/2015 |
| CN | 105133743 B | 4/2017 |
| CN | 106703246 A | 5/2017 |
| CN | 106760844 A | 5/2017 |
| CN | 206319684 U | 7/2017 |
| CN | 107061163 A | 8/2017 |
| CN | 108193796 A | 6/2018 |
| EP | 2889471 A1 | 7/2015 |
| JP | 62199468 U | 12/1987 |
| KR | 101437362 B1 | 9/2014 |
| KR | 101655191 B1 | 9/2016 |

OTHER PUBLICATIONS

European Search Report issued in corresponding European Application No. 18924065.8, dated Jun. 7, 2021 (8 pages).
First Office Action in corresponding Chinese Application No. 201810706129.2 dated Apr. 17, 2020 (15 pages).

* cited by examiner

DAMPER AND LOAD-BEARING ENCLOSING STRUCTURE PROVIDED WITH DAMPER

CROSS-REFERENCE TO RELATED APPLICATIONS

This application is a US national phase of International Application No. PCT/CN2018/105247, filed on Sep. 12, 2018, which claims priority to Chinese Patent Application No. 201810706129.2, filed on Jun. 28, 2018. The entire contents of each of the above-identified applications are incorporated herein by reference.

TECHNICAL FIELD

The present application relates to the technical field of vibration suppression of load-bearing enclosures, and in particular to a damper for suppressing the vibration of a load-bearing enclosure and the load-bearing enclosure with the damper.

BACKGROUND

Wind turbines are energy conversion devices used for converting wind energy into electrical energy. Generally, a wind power generation equipment includes a load-bearing enclosure (for example, a tower), a nacelle provided on the tower, a generator installed in or outside the nacelle, a wind turbine installed in the wind direction on the head of the nacelle, and the like. For the convenience of machining and transportation, the tower is usually manufactured in sections and then transported to the installation site. At the installation site, multiple sections of the tower are hoisted and assembled in sequence, so as to form a support foundation for the nacelle and generator components, and then the tower is connected to a yaw system at the top of the tower, the nacelle is assembled with the generator, and the generator or gear box is assembled and connected with the wind turbine.

These installation procedures are carried out under the condition that the local wind in the small area environment of the wind farm is unpredictable. During this hoisting and installation process, gusts of varying size or sustained light winds may be encountered. When the wind blows through the tower, the left and right sides of a wake flow generates pairs of antisymmetric vortices which are alternately arranged and rotate in opposite directions, namely Carmen vortex. The vortex leaves the tower at a certain frequency, causing the tower to vibrate transversely in a direction perpendicular to the wind. When the vortex separation frequency is close to the natural frequency of the tower, the tower is apt to resonate and may be destroyed.

Figure 1A:
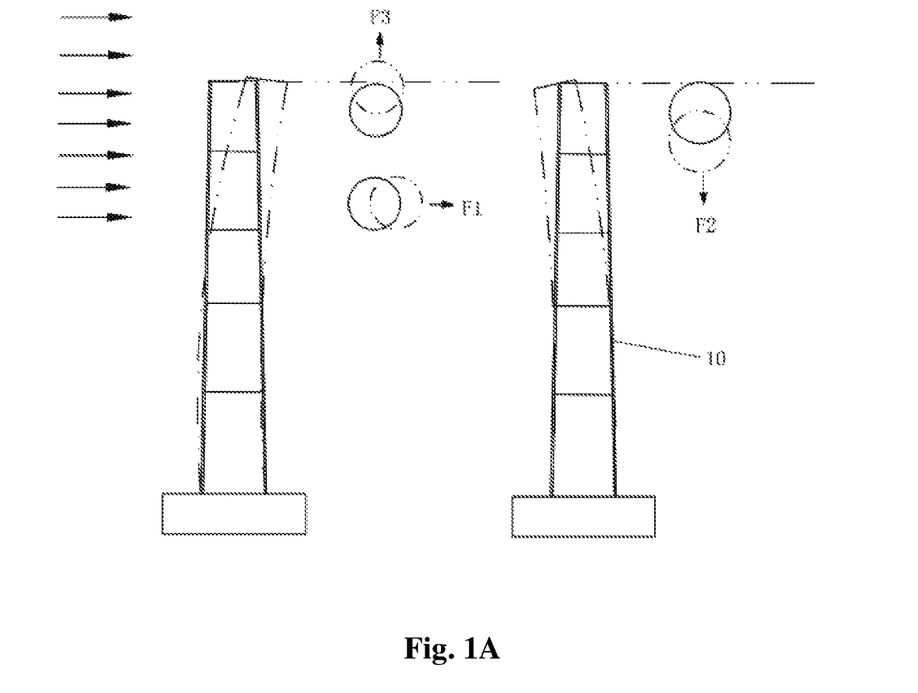
FIG. 1A shows an example in which a tower shakes under the action of upwind current.

FIG. 1A shows an example in which the tower shakes under the action of upwind current. As shown in FIG. 1A, when the wind speed is within a predetermined range, the vortex induced vibration of the tower 10 is caused, and then the tower 10 generates vibrations in the downwind direction (F1) and the crosswind direction (F3, F2).

During the assembly of a wind turbine, the on-site hoisting progress and installation period are apparently restricted by the local wind conditions. Especially when the upper sections of the tower are being installed, the vibration amplitude of the tower increases, the connections between the tower and the yaw position, between the tower and the nacelle, and between the nacelle and the impeller are difficult, and it is impossible to achieve a safe and accurate connection.

During the operation of the wind turbine, the shaking of the tower may also cause damage and hidden dangers to the tower itself and the tower's foundation connections. During the operation of the wind turbine, the tower is not only affected by the gravity generated by the top parts and components and the dynamic load generated by the rotation of the wind wheel, but also affected by natural wind. Vortex street phenomenon generated by wind flowing around the surface of the tower may cause a transverse vibration of the tower which may cause a resonance damage. When the wind blows the impeller to rotate, it may produce alternating bending moment and alternating acting force on the tower. The bending moment and force produced by the downwind direction may become the main reason for the destruction of the tower. In some severe cases, it may cause the tower to break and overturn.

Figure 1B:
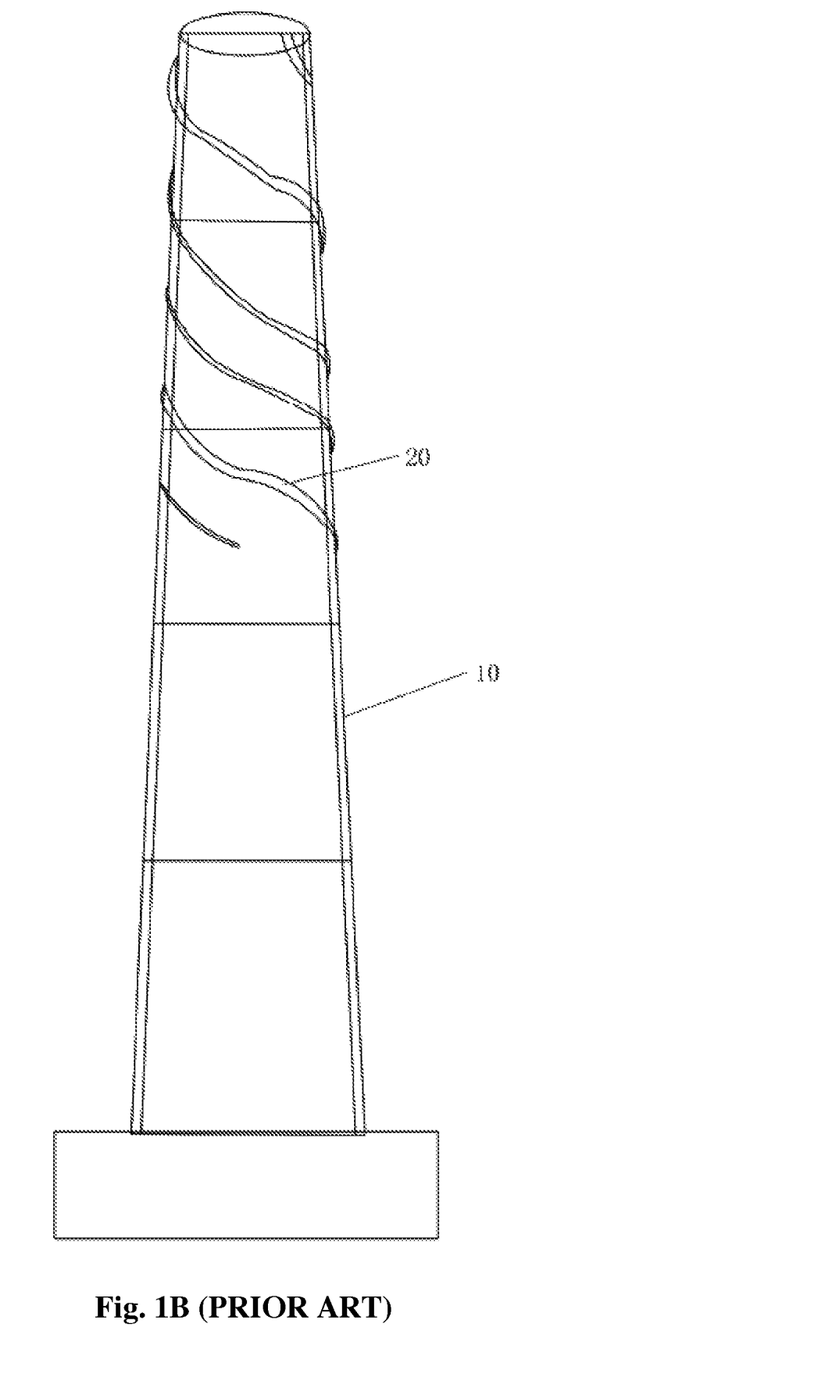
FIG. 1B is a schematic diagram illustrating winding a spiral wire rope or providing spiral ribs on a tower in the prior art.

As shown in FIG. 1B, conventional technology uses a spiral line around the tower to suppress the periodic shedding of vortexes on the surface of the tower 10. The spiral wires 20 have different crosswind oscillation suppression effects when they are arranged at different pitches. The upward extension of the spiral wires 20 may destroy the periodicity of the vortex street distribution, which makes the vortex street phenomenon be not easy to generate or makes the vortex street distribution more irregular, breaks the correlation and consistency of the vortex street distribution, and helps to suppress the vortex-induced vibration.

The method of winding or securing the spiral wires on the tower, however, is only used in the hoisting stage, and the characteristic parameters (pitch and height) of the spiral wires have not been optimized, making it difficult to adapt to changes in wind speed. In order to adapt to the change of wind speed or air flow and be suitable for a long-term operation, the manufacturing cost and maintenance cost of spiral wires may increase greatly.

In addition, the coverage of spiral wires on the surface of tower may also affect the suppression effect of lateral vibration. When the coverage rate reaches (or exceeds) 50%, the effect of restraining lateral vibration is the best, but the wind-induced noise of helix and air flow increases, which has a serious impact on the natural environment, especially on animals and birds, and damages the ecological environment.

Therefore, it is necessary to provide a vibration suppression device which does not affect the appearance of the tower, does not increase the wind resistance of the tower, does not generate noise to the external environment of the tower, may be removed for recycling after hoisting, and may also be fixed inside the tower and used during the operation.

SUMMARY

The present application provides a damper and a load-bearing enclosure with the damper, so as to improve safety, structural stability and hoisting efficiency in a limited hoisting time, and shorten the waste caused by the delay of wind farm construction period due to the uncertainty of wind and the delay of grid-connected power generation of wind turbines, improve the structural stability of the whole machine, and inhibit the excessive fatigue and damage of the whole machine and components caused by vibration induced by fluid-structure coupling in natural environment during operation and shutdown of the unit.

According to an aspect of the present application, a damper including a vibration energy buffer transmission unit and a vibration energy dissipation unit is provided. The vibration energy buffer transmission unit includes multiple piston transmission structures and multiple communication tubes. The piston transmission structures each include a cylinder and a piston arranged in pairs. The piston transmission structures are arranged around the vibration energy dissipation unit. The multiple communication tubes connect the multiple cylinders to each other. The vibration energy dissipation unit includes a damping liquid accommodating cavity and damping liquid contained in the damping liquid accommodating cavity, and one end of each cylinder or piston is connected to the outer wall of the damping liquid accommodating cavity.

According to another aspect of the present application, a load-bearing enclosure is provided, in which the damper as described above is installed.

According to an aspect of the present application, the load-bearing enclosure is a tower of a wind turbine, and the damper is fixed on the inner wall of the tower of the wind turbine.

The above technical solution may not only solve the damage and hidden dangers of the tower foundation connection caused by the sloshing of the tower of the supporting structure during the hoisting of the wind turbine, but also reduce the risk of overturning the tower in the running process of the wind turbine. Therefore, according to the above technical solutions of the embodiments of the present disclosure, it is possible to shorten the construction time of the wind farm and improve the reliability during the operation of the wind turbine, which benefits both the wind farm investor and the builder.

BRIEF DESCRIPTION OF THE DRAWINGS

The above and other objects and features of the present disclosure will become clearer through the following description of the embodiments in conjunction with the drawings.

Reference numerals are as follows:

| | |
|---|---|
| 10 load-bearing enclosure, | 1000, 2000, 3000 damper, |
| 100, 350 housing, | |
| 200, 320 vibration energy dissipation unit, | 110 liquid storage cavity, |
| 120 mass body moving cavity, | 210 damping liquid, |
| 220 mass body, | 221 tooth-shaped protrusion, |
| 222 restricted passage orifice, | |
| 230 damping coefficient adjusting unit, | |
| 231 gas pressure regulating unit, | 240 cavity partition, |
| 310 vibration energy buffer and transmission unit, | |
| 311 cylinder, | 312 piston, |
| 313 communication tube, | |
| 320 vibration energy dissipation unit, | 321 spoiler, |
| 351 outer cylinder wall, | 352 inner cylinder wall, |
| 340 rolling body. | |

DETAILED DESCRIPTION

In order to solve the technical problems in the conventional technology, prevent vortex street phenomenon on the tower and other load-bearing enclosures, prevent excessive vortex-induced response of towers, and suppress tower vibration, a protection system for a wind turbine is built. Through field investigation and research on that construction of wind farm at high altitude and high mountain areas, a vibration energy dissipation structure built inside a load-bearing enclosure and a load-bearing enclosure having the structure is proposed. Hereinafter, embodiments of the present application will be described in detail with reference to the drawings.

Figure 2:
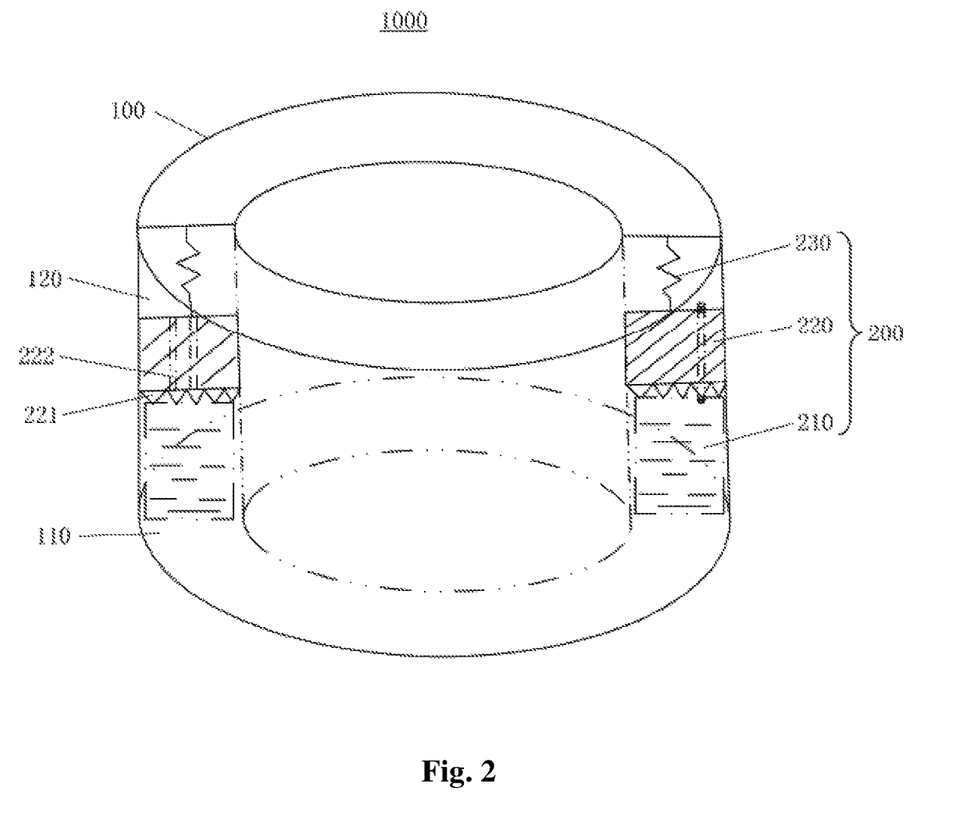
FIG. 2 is a perspective view of a damper according to a first embodiment of the present disclosure.
Figure 3:
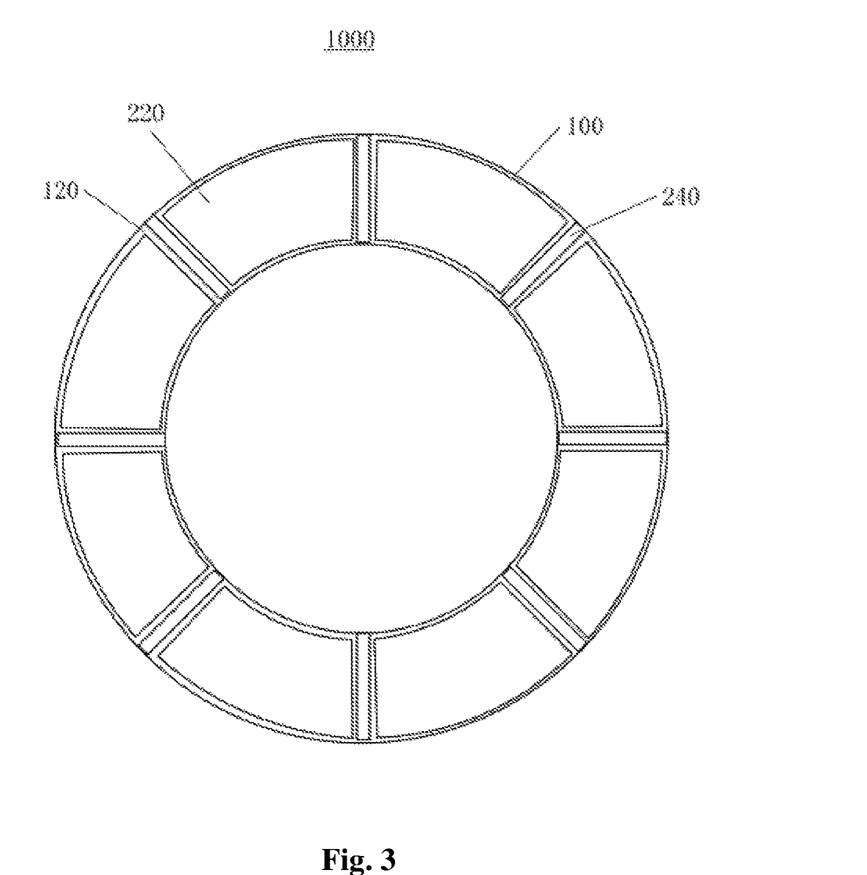
FIG. 3 is a top view of a damper according to the first embodiment of the present disclosure.
Figure 4:
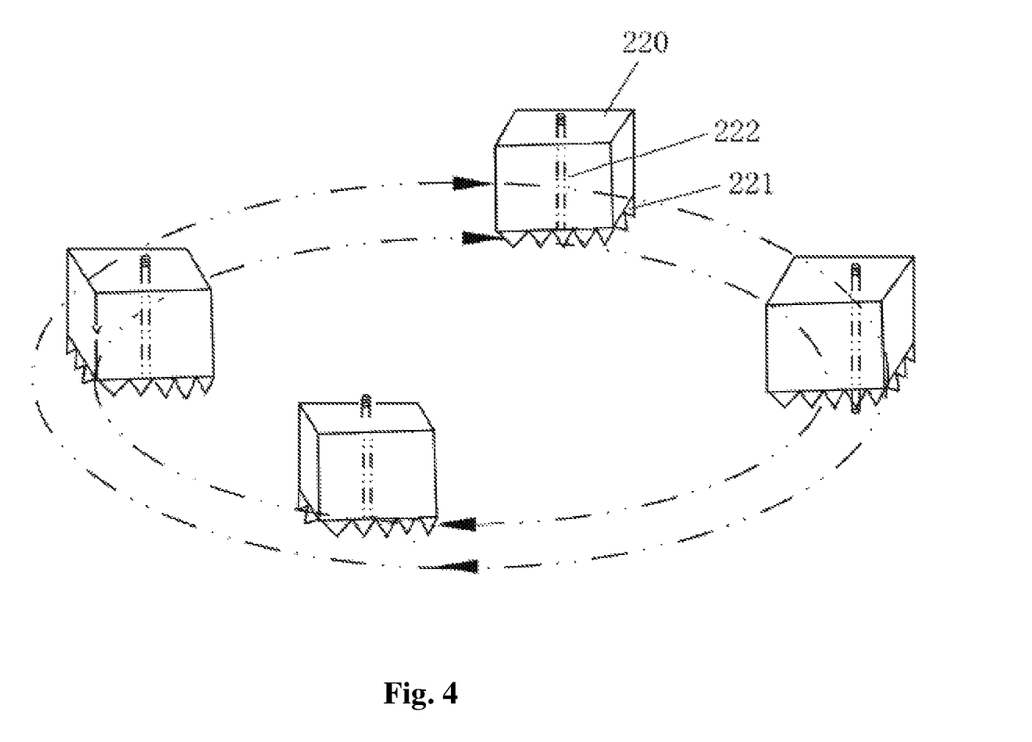
FIG. 4 is a schematic diagram of a three-dimensional structure of a mass body in a damper according to the first embodiment of the present disclosure.
Figure 5:
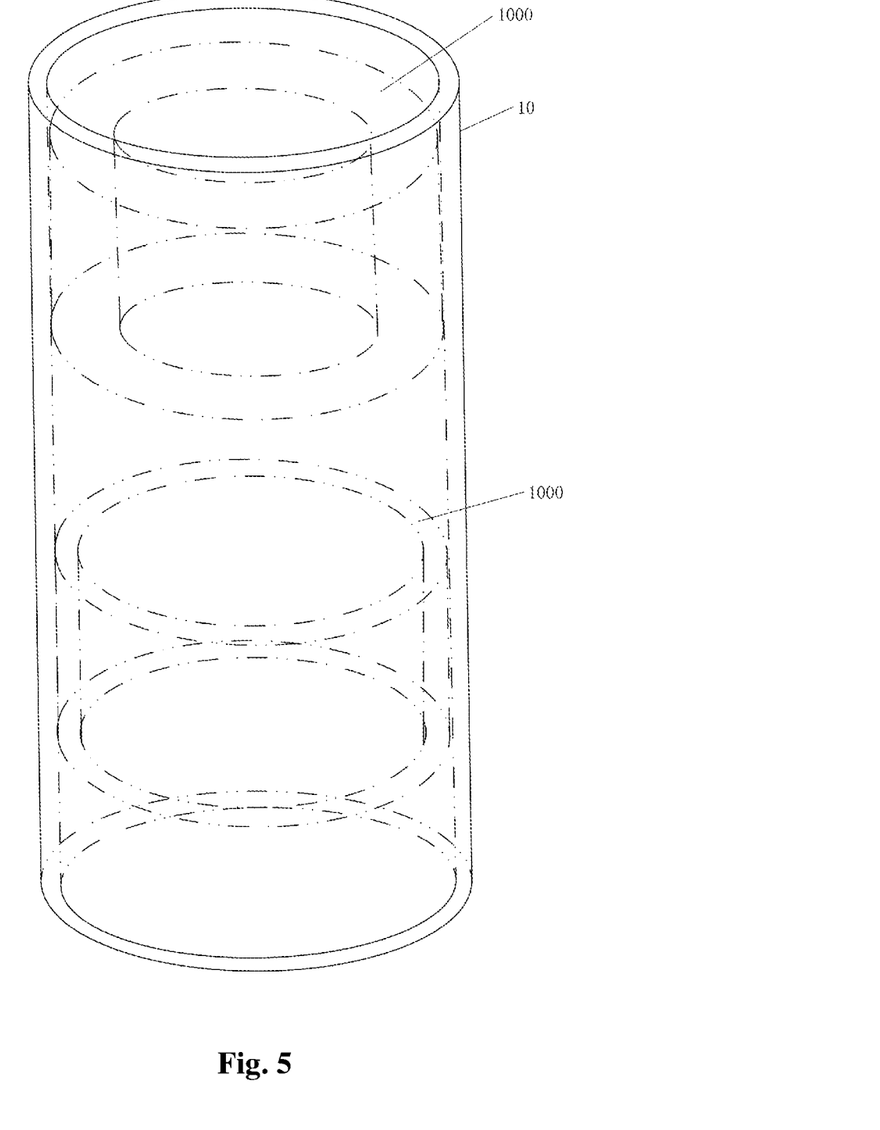
FIG. 5 is a schematic diagram of setting a damper according to the first embodiment of the present disclosure in a load-bearing enclosure.

FIGS. 2 to 4 show schematic diagrams of a damper according to a first embodiment of the present application. FIG. 5 is a schematic diagram of the damper according to the first embodiment of the present application set in a tower.

According to the first embodiment of the present application, the damper 1000 includes a housing 100 forming an accommodating cavity and a vibration energy dissipation unit 200 located in the housing 100.

The accommodating cavity formed by the housing 100 includes a liquid storage cavity 110 and a mass body moving cavity 120 located at an upper part of the liquid storage cavity 110. The energy dissipation unit 200 includes a damping liquid 210 accommodated in the liquid storage cavity 110 and a mass body 220 located in the mass body moving cavity 120. The mass body 220 floats on the liquid surface of the damping liquid 210.

The damper 1000 according to a first embodiment of the present application may be installed in a load-bearing enclosure (e.g., a tower of a wind turbine, a television tower of high rise building, a communication tower, a pillar of a bridge, etc.) 10, for preventing the load-bearing enclosure 10 from vibrating too fast or over an amplitude limit in a predetermined wind speed range. When the load-bearing enclosure 10 vibrates, the kinetic energy or momentum carried by the vibration is transferred to the damper 1000 according to the first embodiment of the present application, and the damper 1000 follows the downwind vibration of the load-bearing enclosure to generate a corresponding downwind direction vibration. The vibration causes the damping liquid 210 to oscillate and fluctuate in the cavity. The mass body 220 in the damping liquid 210 is affected by the liquid. As the wave moves up and down, the kinetic energy obtained by the liquid transfer is converted into other forms of energy such as gravitational potential energy, heat energy, etc., acting as a damper, thereby consuming the vibration kinetic energy of the load-bearing enclosure, and playing a role in suppressing vibration and reducing vibration of the load-bearing enclosure. The energy carried by the downwind vibration of load-bearing enclosure is transferred to the damping liquid and further transferred to mass body by means of the damping liquid, which is converted into the vertical movement of the damping liquid and mass body and the energy carried in the vertical direction, and is dissipated during the vertical movement. Herein, the energy carried by vibration is transferred and dissipated in a orthogonal (or nearly vertical) direction.

In order to dissipate the kinetic energy obtained by the damping liquid and the mass body more effectively, a lower part of the mass body 220 is provided with a wave crushing rake. Multiple tooth-shaped protrusions 221 are formed on a lower surface of the mass body 220, thereby forming the wave crushing rake. Multiple tooth-shaped protrusions 221 formed in the lower part of the mass body 220 may be arranged in lines or cross rows. The heights of the protrusions 221 may be same or may be set up and down, and there are communicated grooves or slots between the protrusions 221. Each of the protrusions 221 may be formed with a sharp tip or a sharp edge. Preferably, the surface of the mass body 220 has been performed an anti-corrosive treatment or it is itself a corrosion-resistant material, and an anti-corrosion layer is formed on the surface of the protrusion 221.

Preferably, the tooth-shaped protrusions 221 on the mass body 220 are arranged in an irregular manner, and are used for generating surface forces in all directions (forces given by the solid surface) on the damping liquid by the sharp tooth-shaped protrusions 221 when the kinetic energy or momentum carried by the ordered damping liquid is always in contact with the lower surface of the mass body (the damping liquid immerses the lower surface of the mass body) and interacts with it, and decompose the fluid contacted by the protrusions 221 into numerous disordered small masses with components in all directions. Specifically, when the damping liquid 210 oscillates due to vibration, the oscillating liquid impacts on the tooth-shaped protrusions 221 of the mass body 220, collides with the tooth-shaped protrusions 221, decomposes the liquid, and is broken and decomposed into small waves in multiple directions. By decomposing large waves into small anisotropic waves, the crisscross grooves between the protrusions 221 on the lower surface of the mass body 220 cause the large kinetic energy or large momentum carried by the liquid in one direction to be decomposed into small kinetic energy or momentum in different directions, and then the small kinetic energy or momentum in different directions collide with each other again, weaken or cancel out, thus the total kinetic energy obtained and carried by the liquid with directional coordination is reduced in value. The vector sum of the shunt momentum after the liquid is divided by the protrusion 221 and its groove is greatly reduced, and the liquid flowing in contact with the protrusion 221 produces a shunt flow in different directions and a surface force in the vertical direction, and the surface force in a horizontal direction in all 360 degrees, thus consuming the vibration energy transmitted by the enclosure in the manner of decomposing the liquid and shunting the liquid momentum, and preventing the vibration of the load-bearing enclosure 10 from exceeding the predetermined amplitude.

As shown in FIG. 3, the damper 1000 may be cylindrical, and multiple mass body moving cavities 120 may be provided along the circumferential direction, and a corresponding mass body 220 is provided in each mass body moving cavity 120. The mass body moving cavity 120 may be separated by a cavity partition 240. The cavity partition 240 is disposed along the height direction of the damper 1000 to make the mass body 220 move in the vertical direction. The height of the cavity partition 240 is not strictly limited, as long as it can provide a guiding function for limiting the mass body 220 and moving the mass body 220 up and down. Preferably, multiple damping liquids at the lower parts of the mass bodies 220 communicate with each other.

The mass body moving cavity 120 and the mass body 220 may have a fan-shaped cross section, and the number of the mass body moving cavity 120 and the mass body 220 may be an even number. The fan shape may be a pointed fan shape or a blunt fan shape (i.e., fan ring shape). As a preferable embodiment, in the example shown in the drawings, the mass body moving cavity 120 and the mass body 220 are shown in the shape of a blunt fan. In this case, the accommodating cavity formed by the housing 100 may be an annular cylindrical structure. The housing 100 may include an outer cylinder wall, an inner cylinder wall, a top wall, and a bottom wall.

According to an embodiment of the present application, when the damping fluid oscillates, the mass body 220 may move up and down with the wave, thereby converting vibration energy into frictional heat energy and dissipating it. In addition, when the liquid level in one side or one direction in the cavity increases and the liquid level in the other side or one direction passing through the center of the horizontal circular section decreases, the kinetic energy in the horizontal direction is converted into the kinetic energy in the vertical direction. As the liquid level rises and falls, the mass body 220 moves up and down. During the upward and downward movement of the mass body 220 carrying kinetic energy or momentum, the mass body 220 rubs against the liquid, the liquid rubs against the chamber wall, and the liquid rubs against the chamber wall in various ways of damping energy consumption to turn (convert to vertical direction) and dissipate vibration energy. At the same time, the moving liquid does work and consumes power during the upward movement of the mass body 220, thereby reducing the amplitude and frequency of the downwind and lateral vibration processes of the load-bearing enclosure.

As shown in FIG. 2, the damping 1000 according to the first embodiment of the present application may further include a damping coefficient adjusting unit 230 for adjusting the damping coefficient of the vibration energy dissipation unit 200. The damping coefficient adjusting unit 230 may be disposed on the upper part of the mass body 220. When the mass body 220 moves upward, a downward force is applied to the mass body 220, and when the mass body 220 moves downward, an upward force is applied to the mass body 220.

In the first embodiment according to the present application, the damping coefficient adjusting unit 230 may be an elastic member with an adjustable rigidity, for example, a spring member with an adjustable rigidity. The damping coefficient adjusting unit 230 is provided on the upper portion of the mass body 220 and applies an elastic force to the mass body 220. Specifically, the elastic member may be provided between the upper surface of the mass body 220 and the top wall of the housing 100.

The damping coefficient of the damper 1000 may be adjusted by adjusting the elastic coefficient of the elastic member, so that the damper 1000 is suitable for different load-bearing enclosures, or the damping coefficient of the damper 1000 may be adjusted according to the vibration parameters of the load-bearing enclosure, for example, according to the external wind speed and/or the lateral vibration amplitude of the tower.

As shown in FIG. 2, a restricted passage orifice 222 may also be formed in the mass body 220, and the restricted passage orifice 222 passes through the mass body 220 along the height direction. Part of the damping liquid 210 may move from the lower part of the mass body 220 to the upper part of the mass body 220 along the restricted passage orifice 222, and then flow into the liquid storage cavity 110 along the outer surface of the mass body 220 or another fluid channel, thereby adjusting the vibration amplitude of the mass body 220 and acting as a differential controller. More specifically, the gas at the upper part of the mass body 220 is communicated with the liquid at the lower part through the restricted passage orifice 222, so as to adjust the pressure difference between the upper and lower surfaces of the mass body 220, thereby inhibiting the rapid movement of the mass body 220 and preventing the vibration amplitude of the mass body 220 from exceeding the limit, hitting the top of the cavity and getting out of control. On each mass body 220, there may be multiple restricted passage orifices 222 distributed at different positions.

The restricted passage orifice 222 may be an equal cross-section orifice or a variable cross-section orifice, and may be a circular orifice or a polygonal orifice. The restricted passage orifice 222 may be formed by forming an orifice in the mass body 220 and then inserting a hollow cylinder into the orifice. Preferably, the lower end of the restricted passage orifice 222 inserts into the damping liquid 210 to a predetermined depth, so as to ensure the lower end inlet to be in communication with the liquid, and the upper end of the restricted passage orifice is higher than the predetermined height of the upper surface of the mass body 220, so as to prevent the liquid on the upper surface of the mass body 220 from flowing back into the restricted passage orifice 222 and blocking the restricted passage orifice 222.

According to the damper 1000 of the embodiment of the present application, the shock absorption function of the load-bearing enclosure is realized by disordering the ordered vibration energy. The dissipated vibration energy is finally converted into heat and other forms of energy. Therefore, a heat dissipation structure, such as a heat dissipation fin or an external radiator, may also be provided on the housing 100. In order to dissipate heat quickly, a cooling fan may also be provided for accelerating the air convection coefficient on the surface of the cooling structure. When the outer wall of the housing 100 is fixedly installed with the load-bearing enclosure, the heat dissipation structure may be provided on the inner cylinder wall of the damper 1000.

In addition, in order to avoid the damping liquid 210 becoming sticky or even freezing in winter when the temperature is low, which may otherwise result in a failure of the damping function of the damper 1000, a heater, a temperature sensor, and other components may also be provided in the liquid storage cavity 110 (not shown). When the temperature in the damping liquid 210 is lower than the predetermined temperature, the heater is activated.

As shown in FIG. 5, the damper 1000 according to the first embodiment of the present application may be installed on the inner wall of the tower 10 of the wind turbine, and may be fixedly connected to the tower 10 through the outer wall of the damper 1000. When the tower 10 vibrates due to the air flow, the vibration is transmitted to the damper 1000 according to the embodiment of the present application. The vibration energy is absorbed and dissipated by the vibration of the damping liquid 210, the mass body 220 and the elastic member.

Figure 6:
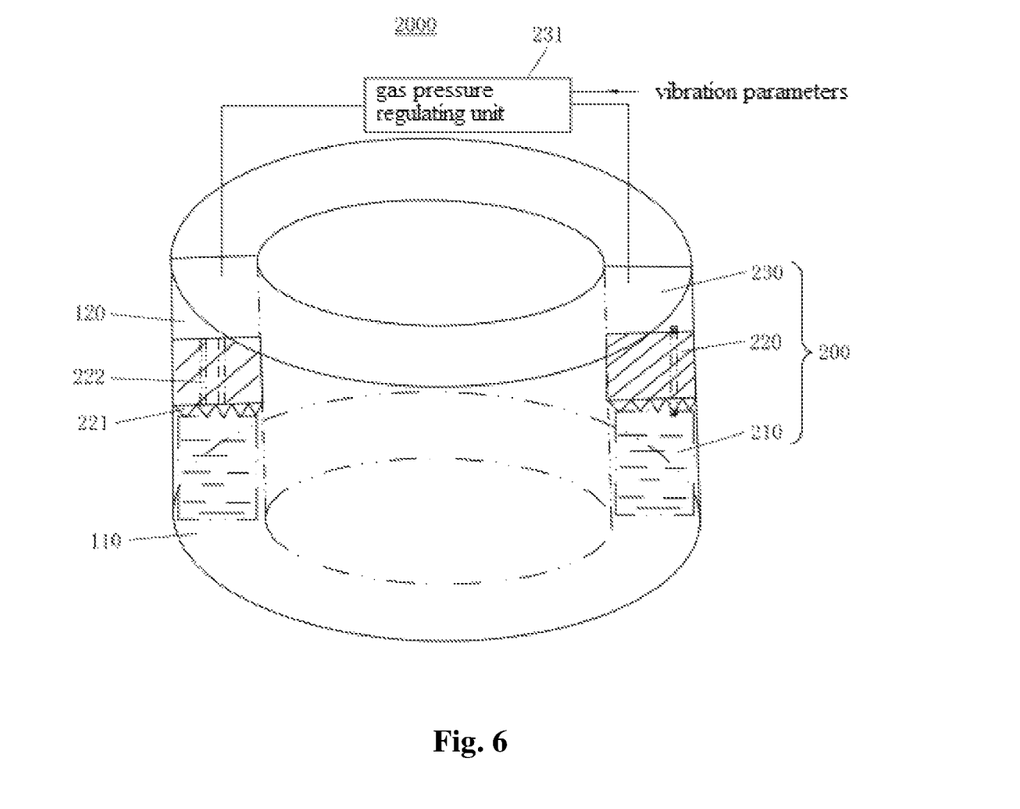
FIG. 6 is a perspective view of a damper according to a second embodiment of the present disclosure.
Figure 7:
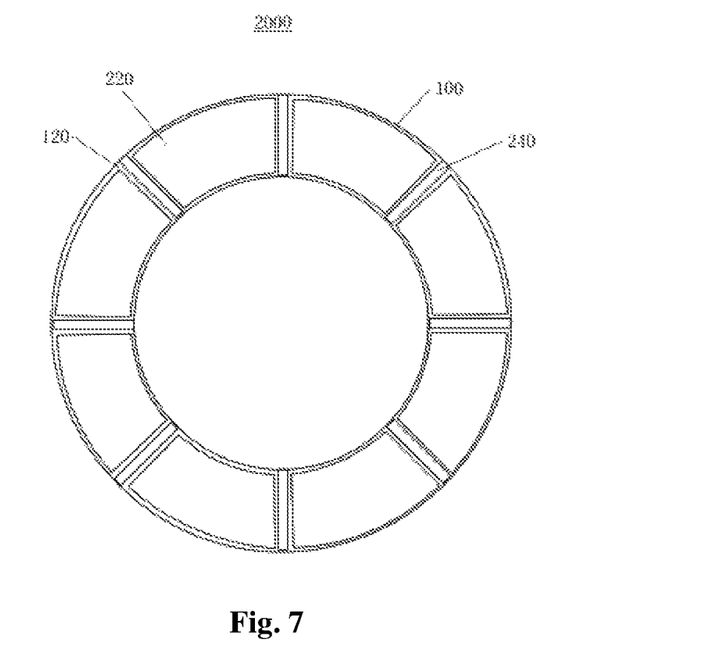
FIG. 7 is a top view of a damper according to the second embodiment of the present disclosure.

FIG. 6 shows a perspective view of a damper according to a second embodiment of the present application. FIG. 7 shows a top view of the damper 2000 according to the second embodiment of the present application. The damper 2000 according to the second embodiment of the present application includes a housing 100 and a vibration energy dissipation unit 200. Except for the structure of the damping coefficient adjusting unit 230, the structure of the damper 2000 according to the second embodiment of the present application is basically the same as that of the damper 2000 according to the first embodiment of the present application. Therefore, only the structure of the damping coefficient adjusting unit 230 will be described in detail below.

According to the second embodiment of the present application, the damping coefficient of the damper 2000 is adjusted by filling the upper space of the mass body 220 with gas and adjusting the pressure of the gas. When the sealing requirements are met, the upper space of the mass body 220 may be directly filled with gas. In addition, a flexible airbag may be provided in the upper space of the mass body 220, an air inlet and an air outlet are provided on the flexible airbag, and the pressure in the flexible airbag is controlled by the gas pressure regulating unit 231.

Therefore, according to the second embodiment of the present application, the damping coefficient adjusting unit 230 further includes the gas pressure regulating unit 231. For example, it includes a compressor and its controller, a pressure measuring sensor, an intake valve, an exhaust valve, etc. The gas pressure regulating unit 231 adjusts the damping coefficient of the damper 2000 by changing the pressure of the gas charged in the upper space of the mass body 220 according to the wind speed, the tower vibration acceleration, the amplitude parameter of the tower shaking, and the like.

The gas in the upper space of the mass body 220 is a fluid damping, and the liquid immersed in the lower part of the mass body 220 is also a fluid damping, that is, when the mass body 220 moves in the gas or liquid, damping is generated by the fluid medium. The fluid damping force is always opposite to the moving speed of the mass body 220. When the gas pressure is small, the downward resistance generated by the gas to the mass body 220 and the damping liquid in the later stage of upward movement is small, and the blocking effect is slow, and the gas space is easily compressed in a short time. The gas absorbs the kinetic energy (ordered energy and high-quality energy) of the upward movement of the mass body 220 and the damping liquid during the rapid compression process, and the compressed energy of the gas is converted into disordered energy (heat energy and low-quality energy) during the compression process. The greater the mechanical energy obtained by the mass body 220 and the damping liquid for upward movement is, and the lower downward resistance in a fast change is, the faster speed the mass body 220 and the damping liquid obtain, and the formed liquid damping force is always opposite to the moving speed of the liquid, and the magnitude is always proportional to the square of the speed. The same is true for the friction damping between the mass body 220 and damping liquid, and between the mass body 220 and the chamber wall. The effect of the gas pressure on the damping mass body and the liquid reaching the top is to prevent the mass body 220 from hitting the top of the housing. The gas pressure may accelerate the downward return movement of the mass body 220 and the liquid. The higher the gas pressure is, the faster the start-up stage returns, which helps the mass body 220 and the damping liquid return. After the information obtained by the pressure sensor is processed by the controller, the pressure adjusting measures are taken for the gas: accelerating the up-anddown movement speed of the liquid and the mass body 220, accelerating the conversion and dissipation rate, thus the damper 2000 can adaptively control the gas pressure in the chamber or air bag according to the vibration state of the enclosure (large or small vibration acceleration and vibration displacement values), so as to accelerate the energy dissipation rate and suppress the vibration acceleration and vibration displacement of the enclosure.

In the damper 2000 according to the second embodiment of the present application, gas may be charged into the mass body moving cavity 120 after being pressurized, and the gas can be used as an energy storage element to form a damping and energy dissipation mechanism in combination together with the movement of the mass body 220.

In the second embodiment according to the present application, the mass body 220 may also be provided with a restricted passage orifice 222. The restricted passage orifice 222 acts as a differential controller, and suppresses the amplitude of the reciprocating vibration of the mass body 220.

Similarly, the damper 2000 according to the second embodiment of the present application may be installed on a load-bearing enclosure, for example, on the inner wall of a tower of a wind turbine, for absorbing and dissipating the vibration kinetic energy of the tower. In the process of hoisting the wind turbine, if the tower is hoisted and the nacelle installation conditions are not met, the tower may be protected. In addition, the damping coefficient of the damper may be adaptively adjusted according to the change of the wind direction and wind force in the hoisting process or the operation process of the wind turbine, so as to achieve the best damping performance.

FIGS. 8 to 11 show a damper according to a third embodiment of the present application. The damper 3000 according to the third embodiment of the present application includes a vibration energy buffer and transmission unit 310 and a vibration energy dissipation unit 320.

The vibration energy buffer and transmission unit 310 receives external vibration kinetic energy, buffers the kinetic energy, and transmits it to the vibration energy dissipation unit 320.

Figure 8:
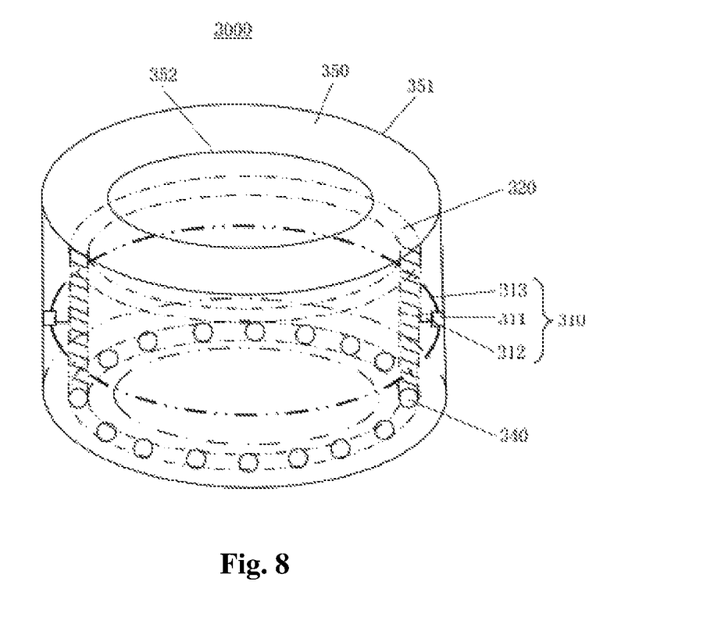
FIG. 8 is a perspective view of a damper according to a third embodiment of the present disclosure.
Figure 9:
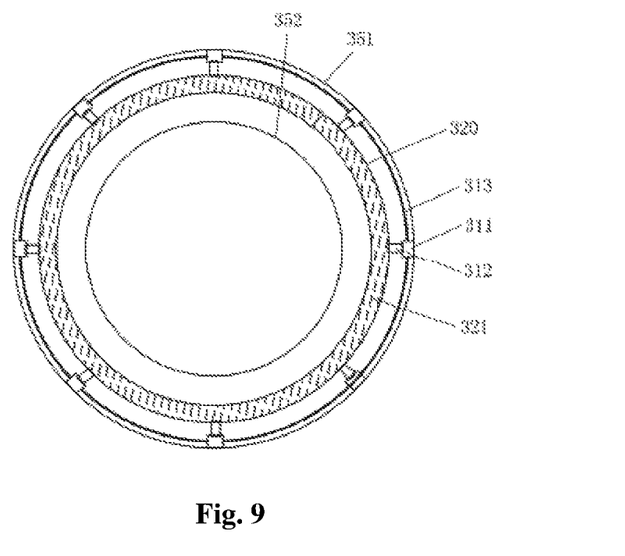
FIG. 9 is a top view of a damper according to the third embodiment of the present disclosure.
Figure 10:
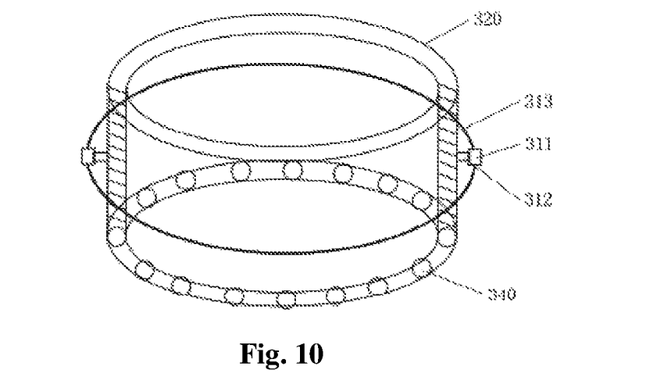
FIG. 10 is a schematic perspective view of a vibration energy dissipation unit in a damper according to the third embodiment of the present application.

As shown in FIGS. 8 to 10, the vibration energy dissipation unit 320 may be substantially circular. The vibration energy buffer and transmission unit 310 is provided outside the vibration energy dissipation unit 320 and transmits vibration kinetic energy to the vibration energy dissipation unit 320.

The vibration energy buffer and transmission unit 310 may include multiple piston transmission structures and communication tubes. Specifically, the piston transmission structure may include a cylinder 311 and a piston 312. The piston transmission structure is arranged in the horizontal direction, and one end of the piston 312 is located in the cylinder 311 and may reciprocate in the cylinder 311. The other end of the piston 312 contacts the vibration energy dissipation unit 320. Preferably, the other end of the piston 312 is hinged with the outer wall of the vibration energy dissipation unit 320. The cylinder 311 and the piston 312 may be an oil cylinder or a cylinder piston structure, and multiple pistons are evenly arranged along the circumferential direction. The cylinder 311 may be filled with gas or hydraulic oil. Multiple cylinders 311 communicate with each other through a corresponding communication tube 313.

The cylinder 311 may be directly fixed to the load-bearing enclosure (for example, tower), and receive vibration kinetic energy from the load-bearing enclosure. The damper 3000 may also be provided with a housing 350 to close the vibration energy buffer and transmission unit 310 together with the vibration energy dissipation unit 320 in the housing 350. When the damper 3000 is installed, the housing 350 may be fixed to the load-bearing enclosure.

When the cylinder 311 vibrates along with the vibration of the load-bearing enclosure, some pistons 312 in the piston transmission structure enter the cylinder 311 to compress the fluid medium (gas or hydraulic oil) in the cylinder 311. During the compression process, the fluid medium automatically flows along the communication tube 313 according to an internal flow channel, thereby seeking to transfer the vibration energy of the enclosing main system in the opposite direction to the fluid being squeezed. The fluid medium flows along the circumferential direction to distribute the kinetic energy to the pistons along the journey, and finally flows into the opposite cylinders, thus the vibration kinetic energy differs from the direction of the initially received vibration kinetic by 180 degrees, and collides and consumes each other at the position of 180 degrees. Through this transfer mode of kinetic energy and momentum, the kinetic energy and momentum may be transferred and dispersed along the circumference at 360 degrees, thus the kinetic energy and momentum of the main system when vibrating in various directions are impacted by head-to-head collision at a relative 180-degree position, cancelling each other, reducing the total vibration energy. When the shaking of the load-bearing enclosure in a certain direction is transferred to damping liquid (or gas), which makes damping liquid (or gas) as energy consumption carrier, the specific performance is the use of the carrier's movement process consumption and the carrier's relative movement after the divergence along the annular flow channel and the final opposing impact, the fluid pressure accumulation after the impact, and the pressure rebound and pressure reflection after fluid pressure accumulation. The vibration energy is converted into pressure energy, heat energy absorption and finally dissipates in the natural environment.

In the third embodiment according to the present application, the vibration energy dissipation unit 320 is substantially of a cylindrical shape, including an annular cavity and damping liquid contained in the cavity. A spoiler 321 is also provided in the annular cavity. By providing the spoiler 321, the damping liquid flows disorderly in the annular cavity, and the ordered vibration kinetic energy is converted into disordered kinetic energy. More specifically, the action of the spoiler 321 allows the turbulent flow of the liquid in the damping liquid. Therefore, the spoiler 321 functions as a dynamic vibration absorption and turbulence generator to decompose and dissipate the energy (momentum) carried by the vibration sloshing. The spoiler 321 may be multiple sieve plates each having multiple sieve holes. When the damping liquid flows along the radial direction, it may be blocked by another sieve plate after passing through the sieve holes of one sieve plate, thus the damping liquid cannot flow along the orderly direction. The damping liquid converts the kinetic energy into heat energy in the annular cavity and dissipates it, thus realizing the effect of reducing the vibration of the load-bearing enclosure. When the load-bearing enclosure vibrates, the vibration energy of the main system of the load-bearing enclosure is transferred to the additional damper system, and the vibration energy is consumed by the spoiler 321. In the consumption process, the flow direction is changed through the nearly zigzag sieve plates (equivalent to changing the momentum of liquid flow), the throttling effect of sieve holes is used for depressurizing the flow process of damping liquid, and the eddy current before and after the throttling holes is used for dissipating the kinetic energy and pressure energy of damping liquid. Under the directional shaking of the main system of the load-bearing enclosure, the impulse transferred by the sieve plates and acting on damping liquid exists in all directions at 360 degrees, and the liquid tributaries which are diverted and decomposed by the sieve plates, carry anisotropic momentum, and are decoupled from the natural frequency of the enclosure during the continuous flow process to achieve irrelevance. The natural frequency of the damper may be designed to deviate from the natural frequency of the enclosure. The sieve plates may be arranged along the height direction of the damper 3000, and are staggered into multiple layers in the radial direction.

The lower part of the vibration energy dissipation unit 320 may also be provided with multiple rolling bodies 340, which may allow the vibration energy dissipation unit 320 to roll on the support plate when the piston 312 is telescopically moved, thereby reducing the friction noise between the vibration energy dissipation unit 320 and the support plate, and protecting the vibration energy dissipation unit 320 from being worn and damaged.

In a case where the damper 3000 includes a housing 350, the housing 350 may include an outer cylinder wall 351 and an inner cylinder wall 352 as well as a top cover and a bottom plate. The cylinder 311 may be fixed on the inner surface of the outer cylinder wall 351, and the multiple rolling bodies 340 may be supported on the bottom plate. In a case where the damper 3000 does not include the housing 350, a mounting base plate may be provided on the load-bearing enclosure to support the vibration energy dissipation unit 320.

Although the vibration energy dissipation unit 320 is shown as a ring shape in the example of the drawings, it may be of a cylindrical shape. In case of the vibration energy dissipation unit 320 being of a cylindrical shape, the housing 350 may not include an inner cylinder wall.

According to an embodiment of the present application, when the fluid medium charged in the piston transmission structure is gas, and the piston on one side enters the cylinder due to vibration, the gas medium is compressed to act as an energy storage medium, and then it is transferred and dispersed along the circumference 360 degrees with kinetic energy, making the damper 3000 to be a 360-degree energy dissipation structure. The vibration energy dissipation unit 320 makes a dynamic response to the vibration kinetic energy transmitted through the radial piston transmission structure, and destroys the ordered energy (directionality) of the liquid medium by using a spoiler, thus the flow of the liquid forms turbulence, thereby increasing the viscosity of the liquid and forming a turbulence kinetic energy dissipation structure.

Figure 11:
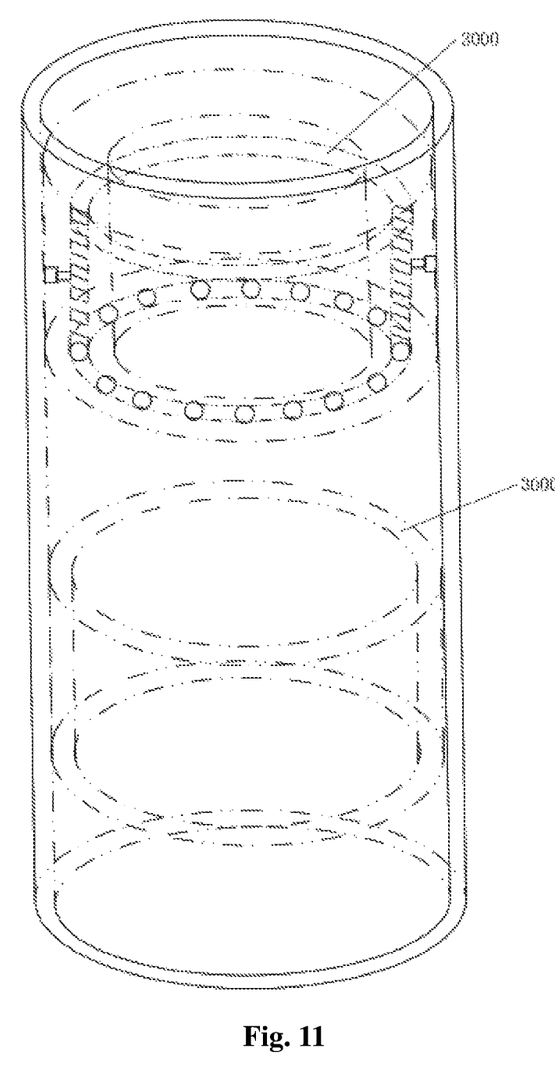
FIG. 11 is a schematic diagram of a damper according to the third embodiment of the present application provided in the tower.

The damper according to the embodiment of the present application may be installed in the tower of the wind turbine. Corresponding dampers may be set for a first-order vibration and a second-order vibration of the system, and multiple dampers may be arranged in layers along the height direction of the tower. The outer wall of the damper may be tightly fixed to the inner wall of the tower.

According to the technical solution of the present disclosure, a protection system is constructed for the load-bearing enclosure structure of the tower of the wind turbine, which is installed in the inner circumference of the upper section of the tower in advance during the construction of the wind farm, and the energy dissipation capacity is built inside the tower. Structural damping may reduce the damage to the tower foundation, reduce the impact of shaking on the attack angle and aerodynamic shape, which is formed by the original upwind air flow in the face of the tower, and improve the utilization rate of wind energy. At the same time, the change of the wind direction on site may also be considered, and the damping coefficient of the damper may be adjusted adaptively to solve the damage and hidden danger to the tower foundation connection caused by the wind-induced sloshing of the wind turbine load-bearing structure (tower) itself during the hoisting process, reduce the construction cost and realize grid-connected power generation as early as possible. By applying the damper according to the embodiment of the present application to a wind turbine, pitch vibration and lateral vibration during the operation of the wind turbine may be suppressed, thereby improving the wind turbine's absorption coefficient of wind energy utilization, improving wind energy conversion rate, and improving power generation amount. In addition, the stability of the whole structure of the unit may be ensured during the operation and shutdown.

Therefore, the embodiment of the present application may not only solve the damage and hidden danger of the tower foundation connecting piece caused by the shaking of the tower bearing structure in the hoisting process, but also reduce the risk of the tower overturning in the operation process of the wind turbine, striving to shorten the construction time and improve the reliability in the operation process of the wind turbine, and benefiting both wind farm investors and builders.

In addition, according to the technical solution of the present application, the problem of noise existing in the conventional vibration suppression device is solved, and the impact on the ecological environment is avoided.

According to the technical solutions of the present application, in addition to the tower of the wind turbine, it can also be applied to various load-bearing enclosures such as column factory chimneys or cooling towers, so as to reduce the risk of collapse of the load-bearing enclosure caused by resonance due to Carmen Vortex street.

The above embodiments of the present application are merely exemplary, and the present application is not limited thereto. It should be understood by those skilled in the art that changes may be made to these embodiments without departing from the principles and spirits of the present application, wherein the scope of protection of the present application is defined in the claims and their equivalents.

The invention claimed is:

1. A wind turbine comprising:
a tower; and
a damper installed in the tower, the damper comprising:
a vibration energy buffer and transmission unit comprising a plurality of piston transmission structures and a plurality of communication tubes;
wherein:
each of the plurality of piston transmission structures comprises a cylinder and a piston arranged in pairs; and
the plurality of piston transmission structures is disposed around the vibration energy dissipation unit, and the plurality of communication tube allows the plurality of cylinders to communicate with each other;
a vibration energy dissipation unit comprising a damping liquid accommodating cavity, damping liquid accommodated in the damping liquid accommodating cavity, and a spoiler disposed in the damping liquid accommodating cavity for disordering the movement of the damping liquid, wherein the spoiler includes a plurality of discrete sieve plates each formed with a plurality of sieve holes and the plurality of discrete sieve plates are staggered into a plurality of layers in a radial direction of the damper; and a first end of the piston is in contact with an outer wall of the damping liquid accommodating cavity.

2. The damper according to claim 1, wherein, the damper further comprises a housing and a plurality of rolling bodies;

the housing comprises an outer cylinder wall, an inner cylinder wall, a top cover and a bottom plate;

an annular accommodating space is formed between the outer cylinder wall and the inner cylinder wall, and the vibration energy buffer and transmission unit and the vibration energy dissipation unit are provided in the annular accommodating space;

the cylinder is fixed on the outer cylinder wall, and the plurality of rolling bodies is disposed on a bottom plate, which is configured to make the vibration energy dissipation unit roll in the housing.

3. The wind turbine according to claim 1, wherein a plurality of dampers are spaced apart along a height direction of the tower.

4. The damper according to claim 1, wherein, a second end of the piston is located in the cylinder, and the first end of the piston is hinged to the vibration energy dissipation unit.

5. A load-bearing enclosure, wherein, the damper according to claim 4 is installed in the load-bearing enclosure.

6. The damper according to claim 4, wherein, the damper further comprises a housing and a plurality of rolling bodies;

the housing comprises an outer cylinder wall, an inner cylinder wall, a top cover and a bottom plate;

an annular accommodating space is formed between the outer cylinder wall and the inner cylinder wall, and the vibration energy buffer and transmission unit and the vibration energy dissipation unit are provided in the annular accommodating space;

the cylinder is fixed on the outer cylinder wall, and the plurality of rolling bodies is disposed on a bottom plate, which is configured to make the vibration energy dissipation unit roll in the housing.

7. The damper according to claim 4, wherein, the vibration energy dissipation unit is of an annular shape, the vibration energy buffer and transmission unit is disposed on an outer periphery of the vibration energy dissipation unit, and the plurality of piston transmission structures are evenly arranged along the outer periphery of the vibration energy dissipation unit.

8. The damper according to claim 7, wherein, the damper further comprises a housing and a plurality of rolling bodies;

the housing comprises an outer cylinder wall, an inner cylinder wall, a top cover and a bottom plate;

an annular accommodating space is formed between the outer cylinder wall and the inner cylinder wall, and the vibration energy buffer and transmission unit and the vibration energy dissipation unit are provided in the annular accommodating space;

the cylinder is fixed on the outer cylinder wall, and the plurality of rolling bodies is disposed on a bottom plate, which is configured to make the vibration energy dissipation unit roll in the housing.

9. The damper according to claim 7, wherein the plurality of discrete sieve plates are arranged along a height direction of the damper.

10. The damper according to claim 9, wherein; the damper further comprises a housing and a plurality of rolling bodies;

the housing comprises an outer cylinder wall, an inner cylinder wall, a top cover and a bottom plate;

an annular accommodating space is formed between the outer cylinder wall and the inner cylinder wall, and the vibration energy buffer and transmission unit and the vibration energy dissipation unit are provided in the annular accommodating space;

the cylinder is fixed on the outer cylinder wall, and the plurality of rolling bodies is disposed on a bottom plate, which is configured to make the vibration energy dissipation unit roll in the housing.

11. The damper according to claim 9, wherein, the sieve holes on adjacent sieve plates are staggered with each other along the radial direction of the damper.

12. The damper according to claim 11, wherein, the damper further comprises a housing and a plurality of rolling bodies;

the housing comprises an outer cylinder wall, an inner cylinder wall a top cover and a bottom plate;

an annular accommodating space is formed between the outer cylinder wall and the inner cylinder wall, and the vibration energy buffer and transmission unit and the vibration energy dissipation unit are provided in the annular accommodating space;

the cylinder is fixed on the outer cylinder wall, and the plurality of rolling bodies is disposed on a bottom plate, which is configured to make the vibration energy dissipation unit roll in the housing.

* * * * *